(12) United States Patent
Morikawa et al.

(10) Patent No.: US 6,992,981 B2
(45) Date of Patent: Jan. 31, 2006

(54) COMMUNICATION SYSTEM AND METHOD CAPABLE OF AVOIDING CONGESTION IN MOVING IMAGE DATA TRANSMISSION

(75) Inventors: Daisuke Morikawa, Saitama (JP); Shinji Ota, Saitama (JP); Shouichi Yamazaki, Saitama (JP); Masayoshi Ohashi, Saitama (JP); Takayuki Warabino, Saitama (JP); Hajime Nakamura, Tokyo (JP); Hideaki Iwashita, Tokyo (JP)

(73) Assignee: KDDI R & D Laboratories Inc., Kamifukuoaka (JP)

( * ) Notice: Subject to any disclaimer, the term of this patent is extended or adjusted under 35 U.S.C. 154(b) by 916 days.

(21) Appl. No.: 10/036,414

(22) Filed: Jan. 7, 2002

(65) Prior Publication Data

US 2002/0089928 A1 Jul. 11, 2002

(30) Foreign Application Priority Data

Jan. 11, 2001 (JP) .............................. 2001-003686

(51) Int. Cl.
*H04J 1/16* (2006.01)
(52) U.S. Cl. ....................................... 370/229; 370/235
(58) Field of Classification Search ................ 370/229, 370/231, 235, 389; 348/384.1, 14.12; 709/235
See application file for complete search history.

(56) References Cited

U.S. PATENT DOCUMENTS 6,060,600 A * 5/2000 Chruscial et al. ............. 546/16
6,304,567 B1 * 10/2001 Rosenberg ................... 370/356
6,369,852 B1 * 4/2002 Honda ......................... 348/192

FOREIGN PATENT DOCUMENTS

JP  2000-83029   3/2000
JP  2001-313937  11/2001

* cited by examiner

*Primary Examiner*—Brenda Pham
(74) *Attorney, Agent, or Firm*—Armstrong, Kratz, Quintos, Hanson & Brooks, LLP (57) ABSTRACT

A communication system capable of avoiding congestion in transmission of moving image data, includes (1) at least one receiving terminal, (2) a moving image delivery device for delivering moving image data to the at least one receiving terminal, (3) a moving image conversion device which has at least one moving image conversion unit for converting, in accordance with conversion parameters, the moving image data sent from the moving image delivery device, a conversion parameter setting unit for determining the conversion parameters, and a monitored result receiving unit, and (4) at least one packet switching node which has at least one data storage unit for preliminarily storing the moving image data from the moving image conversion device to be sent to the at least one receiving terminal, a data amount monitor unit for monitoring an amount of the moving image data stored in the at least one data storage unit to judge that the monitored data amount reaches a first threshold, and a monitored result sending unit for sending a congestion preview information to the moving image conversion device when the data amount monitor unit judges that the monitored data amount reaches the first threshold. The monitored result receiving unit receives the congestion preview information from the monitored result sending unit, and the conversion parameter setting unit determines the conversion parameters so that the moving image conversion unit converts the moving image data sent from the moving image delivery device into a moving image data with a smaller coding bit rate.

20 Claims, 7 Drawing Sheets

COMMUNICATION SYSTEM AND METHOD CAPABLE OF AVOIDING CONGESTION IN MOVING IMAGE DATA TRANSMISSION

FIELD OF THE INVENTION

The present invention relates to a communication system and method capable of avoiding congestion in transmission of moving image data. More particularly, the present invention relates to a congestion control method of controlling a data transfer amount of a moving image by changing a data compression rate at a sender or an intermediate node between a sender and a receiver depending upon characteristics of the communication line or channel used by a user when the user is browsing the moving image delivered from the server via a network such as Internet or Intranet.

DESCRIPTION OF THE RELATED ART

Japanese Patent Publication No. P2000-83029A discloses an image data transfer system capable of congestion avoidance by changing a data compression rate at the server and by controlling a transfer amount of the image data. This system is provided with a storage unit for storing a plurality of video data compressed in different data compression rates to each other about the same video data, and a unit for dynamically selecting either one of the plurality of video data in accordance with the load situation of a network and for transferring the selected video data to a destination through the network.

However, since this system requires previous storing of a plurality of video data compressed with different data compression rates to each other, procedure of the server of the video data will become very complicate. Also, this system does not support the real time delivery of moving image data taken by a video camera for example, through a communication network.

Japanese Patent Publication No. P2001-313937A published on Nov. 9, 2001 discloses a system provided with a quality control unit at a gateway or an receiving end terminal, for changing a data compression rate of the moving image in accordance with coding parameters of image conversion at a server or a gateway. The coding parameters are calculated base upon communication quality information obtained at the quality control unit.

However, according to this system, since the quality control unit is located at an end node of the network, the data compression rate of the moving image is changed in response to detection of lowering of throughput, increasing of delay and occurring of packet loss due to congestion in the network. Thus, it is very difficult to completely avoid occurrence of congestion in the network.

SUMMARY OF THE INVENTION

It is therefore an object of the present invention to provide a communication system and method capable of avoiding congestion in transmission of moving image data, whereby congestion can be completely prevented from occurring at packet switching nodes.

Another object of the present invention is to provide a communication system and method capable of avoiding congestion in transmission of moving image data, whereby congestion can be prevented from occurring without previously storing a plurality of video data compressed with different data compression rates to each other.

According to the present invention, a communication system capable of avoiding congestion in transmission of moving image data, includes (1) at least one receiving terminal, (2) a moving image delivery device for delivering moving image data to the at least one receiving terminal, (3) a moving image conversion device which has at least one moving image conversion unit for converting, in accordance with conversion parameters, the moving image data sent from the moving image delivery device, a conversion parameter setting unit for determining the conversion parameters, and a monitored result receiving unit, and (4) at least one packet switching node which has at least one data storage unit for preliminarily storing the moving image data from the moving image conversion device to be sent to the at least one receiving terminal, a data amount monitor unit for monitoring an amount of the moving image data stored in the at least one data storage unit to judge that the monitored data amount reaches a first threshold, and a monitored result sending unit for sending a congestion preview information to the moving image conversion device when the data amount monitor unit judges that the monitored data amount reaches the first threshold. The monitored result receiving unit receives the congestion preview information from the monitored result sending unit, and the conversion parameter setting unit determines the conversion parameters so that the moving image conversion unit converts the moving image data sent from the moving image delivery device into a moving image data with a smaller coding bit rate.

An amount of the stored moving image to be sent to the receiving terminal is monitored to judge as the monitored data amount reaching a first threshold and to send a congestion preview information when reached. Then, the conversion parameters are determined so as to convert the moving image data to be delivered, into a moving image data with a coding bit rate smaller than that of the current moving image data. Since a preview of congestion is detected and a data compression rate of image data now transferring is dynamically controlled, a congestion can be completely prevented from occurring. Therefore, at the receiving terminal, it is possible to reproduce streaming type moving image data without any lack of frame and without increasing a delay. The present invention also provides effective utilization of communication channels.

Furthermore, according to the present invention, since the data compression rate of the moving image data can be varied depending upon the transmission state in the network, video data with different data compression rates are not necessary to previously store in the moving image delivery device. Also, the amount of the moving image stored in the data storage unit in the packet switching node is monitored to control the transfer amount of the moving image data, no overflow of data at the packet switching node which is connected with the receiving terminal via a radio channel in a mobile communication network occurs even if the transmission rate of the radio channel abruptly changes due to radio environment change.

It is preferred that the data amount monitor unit monitors an amount of the moving image data stored in the at least one data storage unit to judge as the monitored data amount reaching a second threshold which is smaller than the first threshold, that the monitored result sending unit sends a congestion avoidance information to the moving image conversion device when the data amount monitor unit judges as the monitored data amount reaching the second threshold, that the monitored result receiving unit receives the congestion avoidance information from the monitored result sending unit, and that the conversion parameter setting unit determines the conversion parameters so that the moving image conversion unit converts the moving image data sent from the moving image delivery device into a moving image data with a coding bit rate larger than that of the sent moving image data.

It is also preferred that the data amount monitor unit judges as being the congestion preview state until the monitored data amount reaches the second threshold after the monitored data amount reaches the first threshold, and as being the congestion avoidance state until the monitored data amount reaches the first threshold after the monitored data amount reaches the second threshold.

It is preferred that the monitored result sending unit sends the congestion preview information or the congestion avoidance information at a constant interval.

It is preferred also that the data amount monitor unit calculates a new coding bit rate when the data amount monitor unit judges that the monitored data amount reaches the first threshold, that the monitored result sending unit sends the calculated new coding bit rate in addition to the congestion preview information, that the monitored result receiving unit receives the calculated new coding bit rate in addition to the congestion preview information, and that the conversion parameter setting unit determines the conversion parameters so that the moving image conversion unit converts the moving image data sent from the moving image delivery device depending upon the calculated new coding bit rate.

It is further preferred that the data amount monitor unit calculates a new coding bit rate enabling to avoid congestion state after a lapse of a predetermined time, depending upon a change in the stored data amount during a predetermined period of time.

It this case, preferably the data amount monitor unit calculates a low coding bit rate so as to decrease a difference between an estimate data amount after a lapse of the predetermined time and a second threshold which is smaller than the first threshold, when the change in the stored data amount during a predetermined period of time is positive change. Also, preferably, the data amount monitor unit calculates a high coding bit rate so as to increase a difference between an estimate data amount after a lapse of the predetermined time and an amount of data now stored, when the change in the stored data amount during a predetermined period of time is negative change.

It is preferred that the data amount monitor unit monitors, instead of the amount of data stored in the at least one data storage unit, a data amount which is smoothed in accordance with the amount of data stored in the at least one data storage unit. Thus, even if the amount of change in the monitored data amount increases, the detection of the congestion preview state or the congestion avoidance state will not frequently occur.

It is also preferred that there are a plurality of receiving terminals, and the conversion parameter setting unit includes a plurality of conversion parameter setting unit for the respective receiving terminals, that the at least one data storage unit includes a plurality of data storage unit for preliminarily storing the moving image data to be sent to the respective receiving terminals, the data amount monitor unit monitors the stored data for the respective receiving terminals, and the monitored result sending unit sends the congestion preview information or the congestion avoidance information for the respective receiving terminals, and that the monitored result receiving unit receives the congestion preview information or the congestion avoidance information for the respective receiving terminals, and the conversion parameter setting unit determines the conversion parameters for the respective receiving terminals.

According to the present invention, furthermore, a communication method capable of avoiding congestion in transmission of moving image data, includes a step of converting moving image data to be delivered to at least one receiving terminal, in accordance with conversion parameters, a step of preliminarily storing the converted moving image data to be sent to the at least one receiving terminal, a step of monitoring an amount of the stored moving image data to judge that the monitored data amount reaches a first threshold, a step of sending a congestion preview information when it is judge that the monitored data amount reaches the first threshold, a step of receiving the sent congestion preview information, and a step of determining the conversion parameters so that the converting step converts the moving image data into a moving image data with a smaller coding bit rate.

Since a preview of congestion is detected and a data compression rate of image data now transferring is dynamically controlled, a congestion can be completely prevented from occurring. Therefore, at the receiving terminal, it is possible to reproduce streaming type moving image data without any lack of frame and without increasing a delay. The present invention also provides effective utilization of communication channels.

Furthermore, according to the present invention, since the data compression rate of the moving image data can be varied depending upon the transmission state in the network, video data with different data compression rates are not necessary to previously store in the moving image delivery device. Also, the amount of the moving image stored is monitored to control the transfer amount of the moving image data, no overflow of data at a packet switching node which is connected with the receiving terminal via a radio channel occurs even if the transmission rate of the radio channel abruptly changes due to radio environment change.

It is preferred that the monitoring step includes monitoring an amount of the stored moving image data to judge that the monitored data amount reaches a second threshold which is smaller than the first threshold, that the sending step include sending a congestion avoidance information when it is judged as the monitored data amount reaching the second threshold, that the receiving step includes receiving the congestion avoidance information, and that the determining step includes determining the conversion parameters so that the converting step converts the moving image data into a moving image data with a coding bit rate larger than that of the sent moving image data.

It is also preferred that the monitoring step includes judging that it is the congestion preview state until the monitored data amount reaches the second threshold after the monitored data amount reaches the first threshold, and judging that it is the congestion avoidance state until the monitored data amount reaches the first threshold after the monitored data amount reaches the second threshold.

It is further preferred that the sending step includes sending the congestion preview information or the congestion avoidance information at a constant interval.

It is preferred that the monitoring step includes calculating a new coding bit rate when it is judged as the monitored data amount reaching the first threshold, that the sending step includes sending the calculated new coding bit rate in addition to the congestion preview information, that the receiving step include receiving the calculated new coding bit rate in addition to the congestion preview information, and that the determining step includes determining the conversion parameters so that the converting step converts the moving image data depending upon the calculated new coding bit rate.

It is also preferred that the monitoring step includes calculating a new coding bit rate enabling to avoid congestion state after a lapse of a predetermined time, depending upon a change in the stored data amount during a predetermined period of time.

In this case, preferably, the monitoring step includes calculating a low coding bit rate so as to decrease a difference between an estimate data amount after a lapse of the predetermined time and a second threshold which is smaller than the first threshold, when the change in the stored data amount during a predetermined period of time is positive change. Also, preferably, the monitoring step includes calculating a high coding bit rate so as to increase a difference between an estimate data amount after a lapse of the predetermined time and an amount of data now stored, when the change in the stored data amount during a predetermined period of time is negative change.

It is preferred that the monitoring step includes monitoring, instead of the stored data amount, a data amount which is smoothed in accordance with the stored data amount.

It is also preferred that the converting step includes converting the moving image data to be sent to a plurality of receiving terminals, the storing step includes preliminarily storing the converted moving image data for the respective receiving terminals, the monitoring step includes monitoring the stored data for the respective receiving terminals, and the sending step include sending the congestion preview information or the congestion avoidance information for the respective receiving terminals, and that the receiving step includes receiving the congestion preview information or the congestion avoidance information for the respective receiving terminals, and the determining step includes determining a plurality of conversion parameters for the respective receiving terminals. Since the congestion state is judged for every receiving terminal, data traffic control in a public communication network is enabled.

Further objects and advantages of the present invention will be apparent from the following description of the preferred embodiments of the invention as illustrated in the accompanying drawings.

DESCRIPTION OF THE PREFERRED EMBODIMENTS

Figure 1:
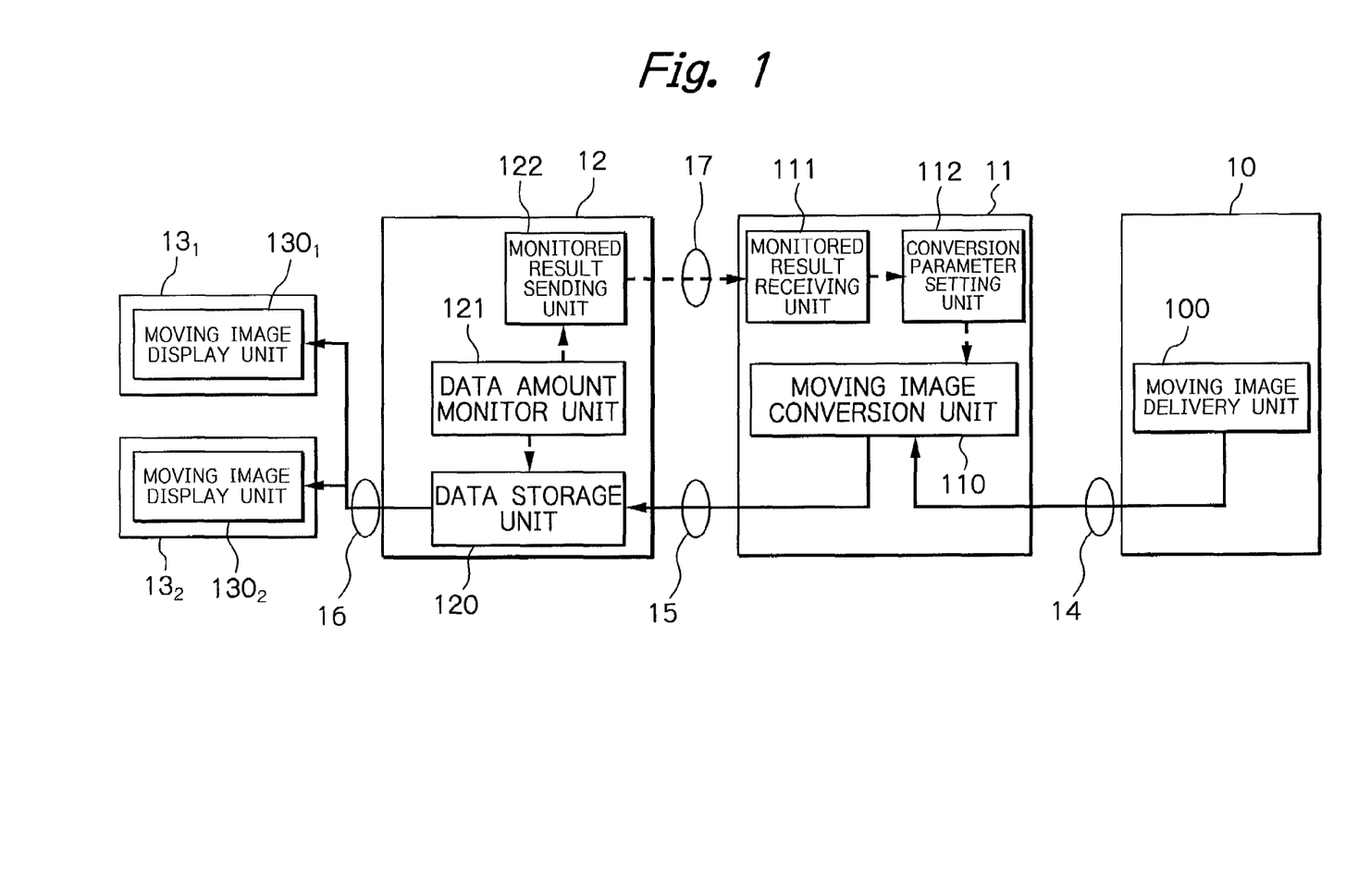
FIG. 1 shows a block diagram illustrating a configuration of a communication system as a preferred embodiment according to the present invention.

As shown in FIG. 1, a communication system illustrated as a preferred embodiment according to the present invention includes a moving image delivery device 10, a moving image conversion device 11, a packet switching device or node 12, and first and second receiving terminals $13_1$ and $13_2$ for first and second users respectively.

The moving image delivery device 10 is provided with a moving image delivery unit 100 for sending moving image data to the moving image conversion device 11 via a first communication line or channel 14. The moving image data sent may be preliminarily stored in the moving image delivery device 10 or may not be stored therein.

The moving image conversion device 11 is provided with a moving image conversion unit 110, a monitored result receiving unit 111 and a conversion parameter setting unit 112.

The moving image conversion unit 110 obtains conversion parameters from the setting unit 112, converts, depending upon the conversion parameters, the moving image data received via the channel 14, and then sends the converted moving image data to the packet switching device 12 the via a second communication line or channel 15.

The monitored result receiving unit 111 receives a congestion preview information or a congestion avoidance information, containing destination information for specifying a receiving terminal from the packet switching device 12 via a fourth communication line or channel 17, and transfers the received information to the setting unit 112.

The setting unit 112 determines the moving image conversion parameters to decrease an amount of the transferred moving image data by a predetermined amount when a congestion preview information is transferred. If a new coding bit rate calculated in accordance with the monitored result is attached to the congestion preview information received at the receiving unit 111, the setting unit 112 changes the moving image conversion parameters depending upon the attached new coding bit rate.

Also, the setting unit 112 determines the moving image conversion parameters to increase an amount of the transferred moving image data by a predetermined amount when a congestion avoidance information is transferred. If a new coding bit rate calculated in accordance with the monitored result is attached to the congestion avoidance information received at the receiving unit 111, the setting unit 112 changes the moving image conversion parameters depending upon the attached new coding bit rate.

The packet switching node 12 is provided with a data storage unit 120, a data amount monitor unit 121 and a monitored result sending unit 122.

The data storage unit 120 temporarily stores the moving image data received via the second channel 15, and then sends the moving image data to a third communication line or channel 16 which is defined by the destination information for specifying a receiving terminal, contained in the data. The amount of data stored in the storage unit 120 will be gradually increased when the amount of data capable to transfer through the third channel 16 is smaller than the stored amount of data to be transferred.

The data amount monitor unit 121 monitors a stored amount of data in the storage unit 120, and activates the monitor result sending unit 122 when recognizing that the stored data amount reaches a first threshold.

The monitor result sending unit 122 produces a congestion preview information containing a destination information for specifying a receiving terminal when triggered by the monitor unit 121, and sends the produced information to the moving image conversion device 11 via the fourth channel 17. The sending unit 122 may send the congestion preview information with attaching a new coding bit rate calculated in accordance with the monitored result.

The data amount monitor unit 121 also monitors a stored amount of data in the storage unit 120, and activates the monitor result sending unit 122 when recognizing that the stored data amount decreases lower than a second threshold after it reaches the first threshold.

In this case, the monitor result sending unit 122 produces a congestion avoidance information containing a destination information for specifying a receiving terminal when triggered by the monitor unit 121, and sends the produced information to the moving image conversion device 11 via the fourth channel 17. The sending unit 122 may send the congestion avoidance information with attaching a new coding bit rate calculated in accordance with the monitored result.

The receiving terminals $13_1$ and $13_2$ are provided with moving image display units $130_1$ and $130_2$ for displaying moving images based upon the data received through the third channel 16, respectively.

In modification, the aforementioned moving image conversion unit and data amount monitor unit may be located in the same node.

Figure 2:
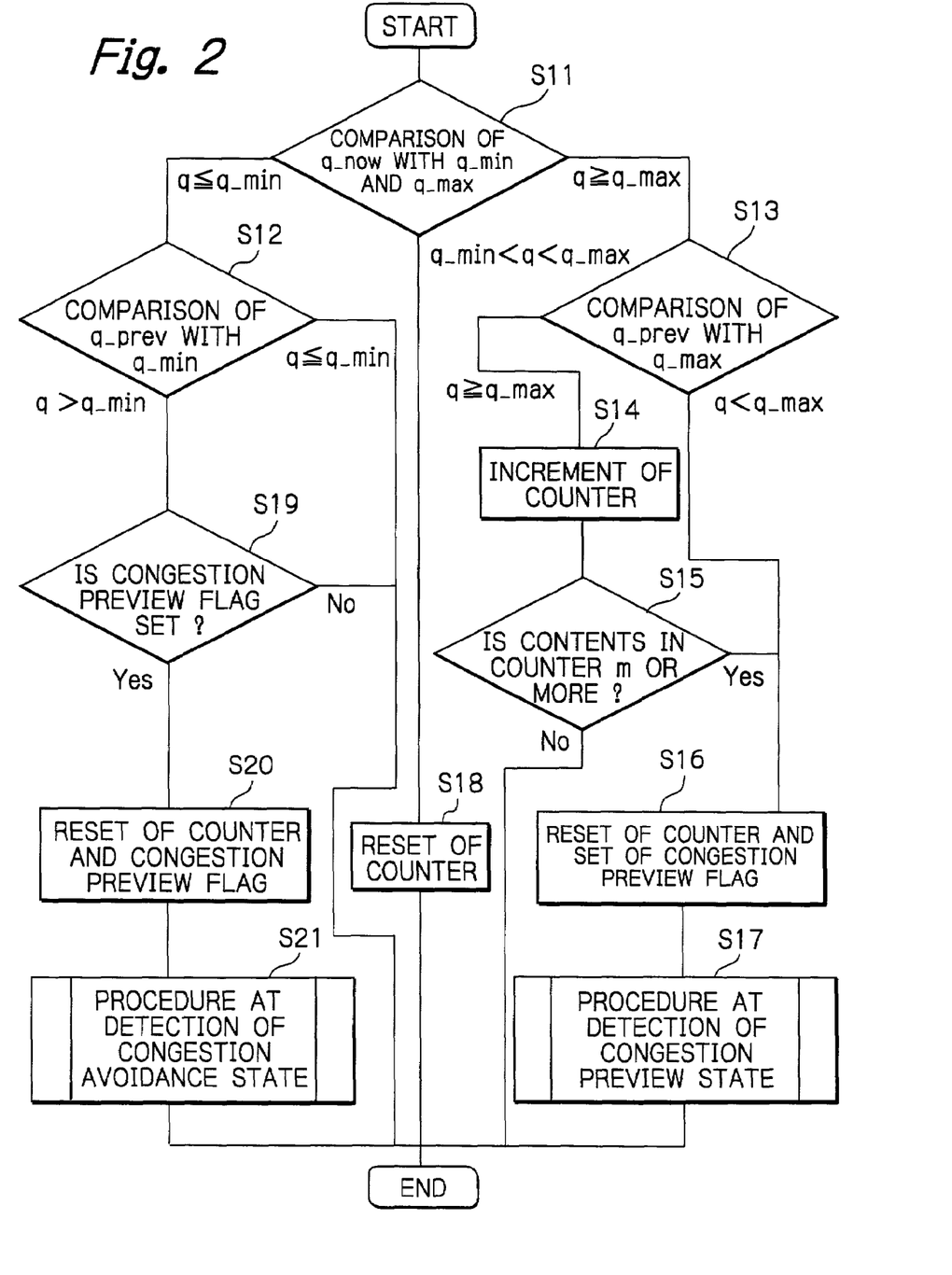
FIG. 2 shows a flow chart illustrating a congestion monitoring program provided in a data amount monitor unit in the communication system shown in FIG. 1.

FIG. 2 illustrates a congestion monitoring program provided in the data amount monitor unit 121.

Assuming that q_now [kilo bytes] indicate an amount of data stored now or at this time, q_prev [kilo bytes] indicates an amount of data stored previously or at previous time, q_max [kilo bytes] indicates the first threshold, q_min [kilo bytes] the second threshold, and m indicates a counter threshold, respectively.

First, at step S11, an amount of now stored data q_now is compared with the first and second thresholds q_max and q_min.

If it is judged at step S11 that the amount of the now stored data q_now is equal to or smaller than the second threshold q_min, the amount of the previous stored data q_prev is compared with the second threshold q_min at step S12.

If it is judged at step S11 that the amount of the now stored data q_now is equal to or larger than the first threshold q_max, the amount of the previous stored data q_prev is compared with the first threshold q_max at step S13.

If it is judged at step S13 that the amount of the previous stored data q_prev is equal to or larger than the first threshold q_max, a counter is incremented by one at step S14.

Then, contents in the counter is compared with the counter threshold m at step S15.

If it is judged that the contents in the counter is equal to or larger than the counter threshold m at step S15 or that the amount of the previous stored data q_prev is smaller than the first threshold q_max at step S13, the counter is reset and a congestion preview flag is set at step S16. Thus, it is judged that a congestion preview state is detected and a necessary procedure such as calculation of a new coding bit rate based upon the monitored results will be executed at step S17.

If it is judged that the contents in the counter is smaller than the counter threshold m at step S15, the program will end.

If it is judged at step S11 that the amount of the now stored data q_now is smaller than the first threshold q_max and larger than the second threshold q_min, the counter is reset at step S18.

If it is judged at step S12 that the amount of the previous stored data q_prev is larger than the second threshold q_min, the congestion preview flag is checked at step S19. If it is set, the program will proceed to step S20, but if it is not set, the program will end. Also at step S12, if it is judged that the amount of the previous stored data q_prev is equal to or smaller than the second threshold q_min, the program will end.

At step S20, the counter is reset and also the congestion preview flag is reset. In this case, it is judged that an avoidance of congestion state is detected and a necessary procedure such as calculation of a new coding bit rate based upon the monitored results will be executed at step S21.

Figure 3:
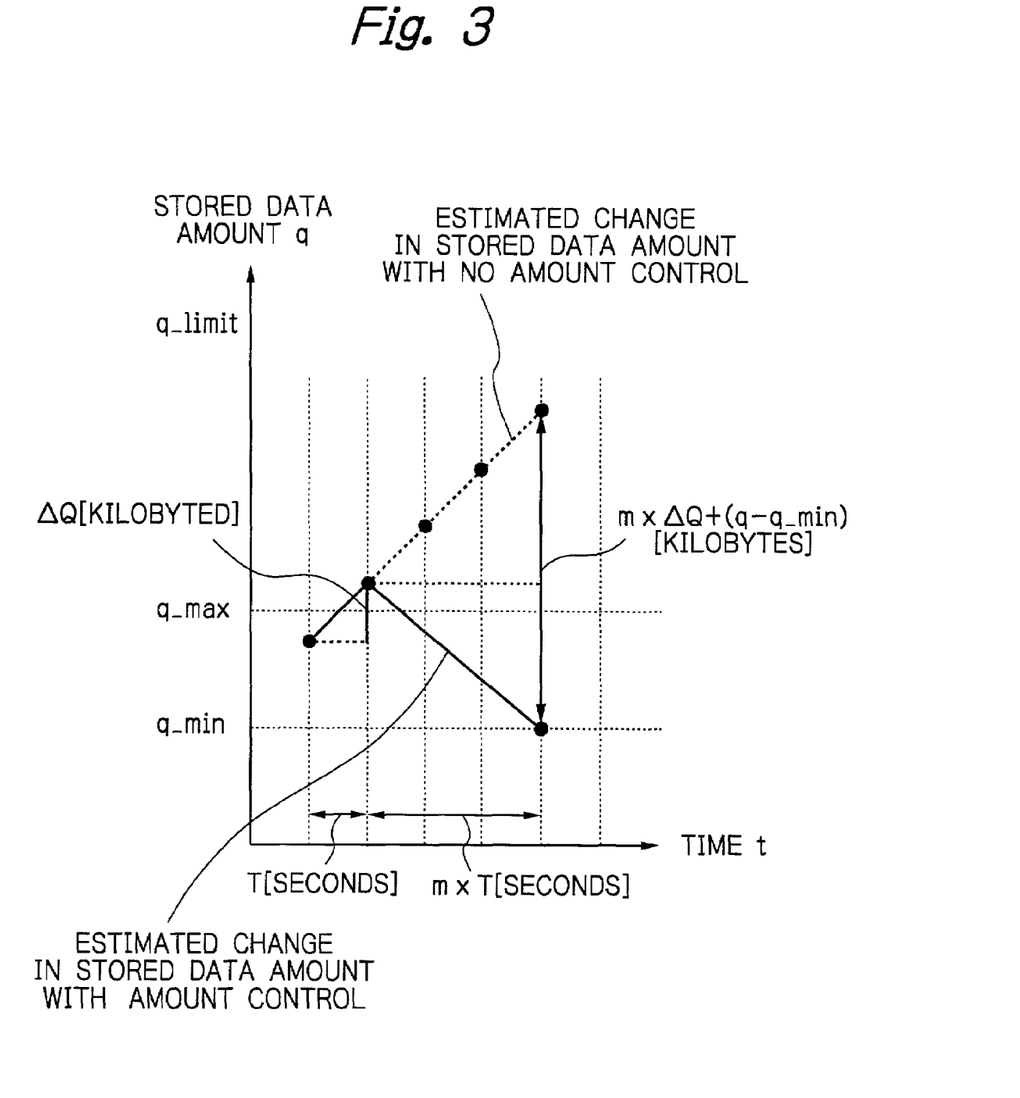
FIG. 3 illustrates a method of calculating a new coding bit rate based upon the monitored results when a congestion preview state is detected.

FIG. 3 illustrates a method of calculating a new coding bit rate based upon the monitored results when a congestion preview state is detected.

The first and the second thresholds q_max and q_min are preliminarily determined to values smaller than the maximum amount of stored data q_limit [kilo bytes]. The data amount monitor unit 121 will check the amount of data stored in the storage unit 120 at a time interval of T [seconds].

When the stored data amount exceeds the first threshold q_max for the first time, it is judged as a congestion preview state. Then, a new coding bit rate for the moving image data now transferred is determined so that the stored data amount decreases to the second threshold q_min after a lapse of m×T [seconds]. The determination of the new coding bit rate is performed as follows.

First, an amount of data to be stored if no amount control is executed is estimated on the analogy of the history of change in the stored data amount. The most simple way for performing this is to extrapolate a line with a gradient of $\Delta Q/T$ [kilo bytes/second] where $\Delta Q$ [kilo bytes] is the amount of change between the previous stored data amount q_prev [kilo bytes] and the now stored data amount q_now [kilo bytes], namely $\Delta Q = q\_now - q\_prev$. Therefore, the estimated increasing amount for m×T [seconds] is m×$\Delta Q$ [kilo bytes]. Then, the data amount to be decreased during a period of time m×T [seconds] becomes m×$\Delta Q$+(q−q_min) [kilo bytes]

Thus, the new coding bit rate should be determined by decreasing {m×$\Delta Q$+(q−q_min)}×8/(m×T) [kilo bps] from the current coding bit rate.

Figure 4:
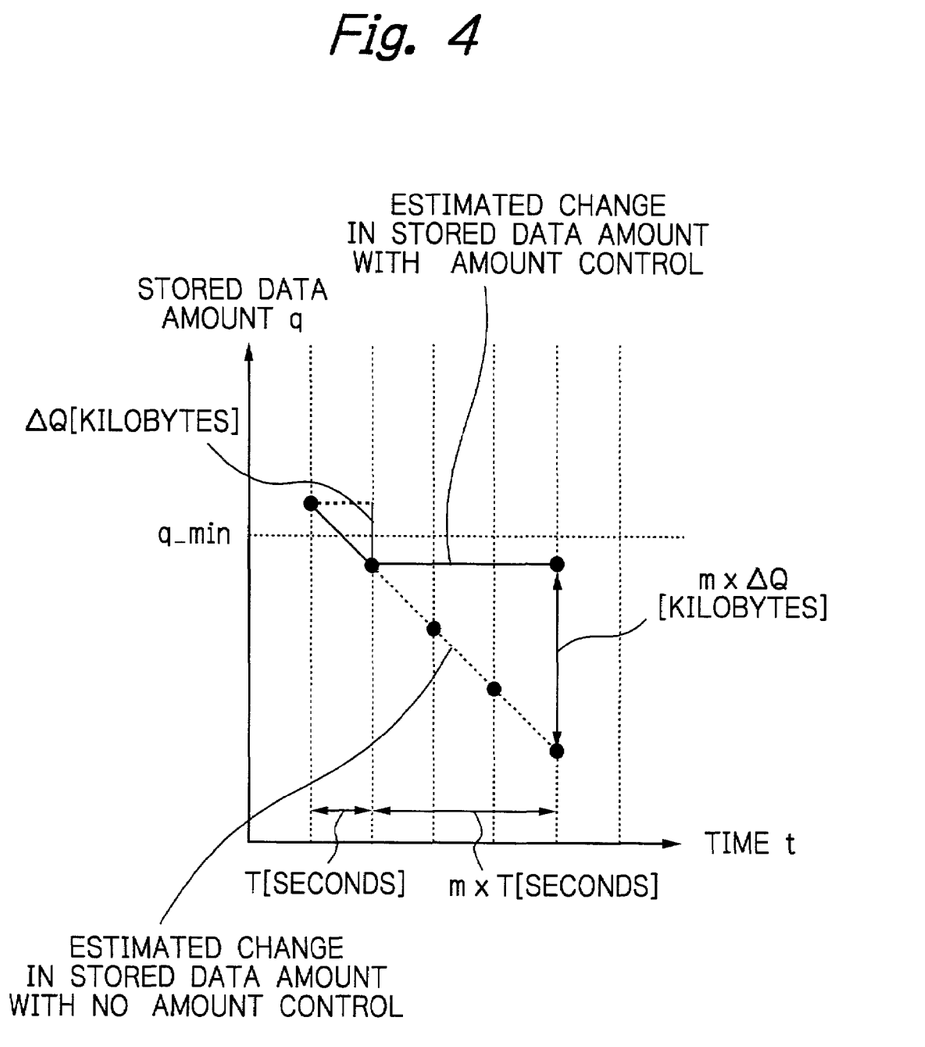
FIG. 4 illustrates a method of calculating a new coding bit rate based upon the monitored results when a congestion avoidance state is detected.

FIG. 4 illustrates a method of calculating a new coding bit rate based upon the monitored results when a congestion avoidance state is detected.

When the stored data amount falls below the second threshold q_min after the congestion preview state was detected, it is judged as a congestion avoidance state. In this case, if no amount control is executed, the stored data amount will continue decreasing and as a result a capacity of the third channel will not be effectively utilized. Then, a new coding bit rate for the moving image data now transferred is determined within a range no congestion preview occurs. The determination of the new coding bit rate is performed as follows.

First, an amount of data to be stored if no amount control is executed is estimated on the analogy of the history of change in the stored data amount. The most simple way for performing this is to extrapolate a line with a gradient of ΔQ/T [kilo bytes/second] where ΔQ [kilo bytes] is the amount of change between the previous stored data amount q_prev [kilo bytes] and the now stored data amount q_now [kilo bytes], namely ΔQ=q_now−q_prev. Therefore, the estimated decreasing amount for m×T [seconds] is m×ΔQ [kilo bytes]. Then, the data amount to be increased during a period of time m×T [seconds] becomes m×ΔQ [kilo bytes]

Thus, the new coding bit rate should be determined by decreasing (m×ΔQ)×8/(m×T)=ΔQ×8/T [kilo bps] from the current coding bit rate.

Figure 5:
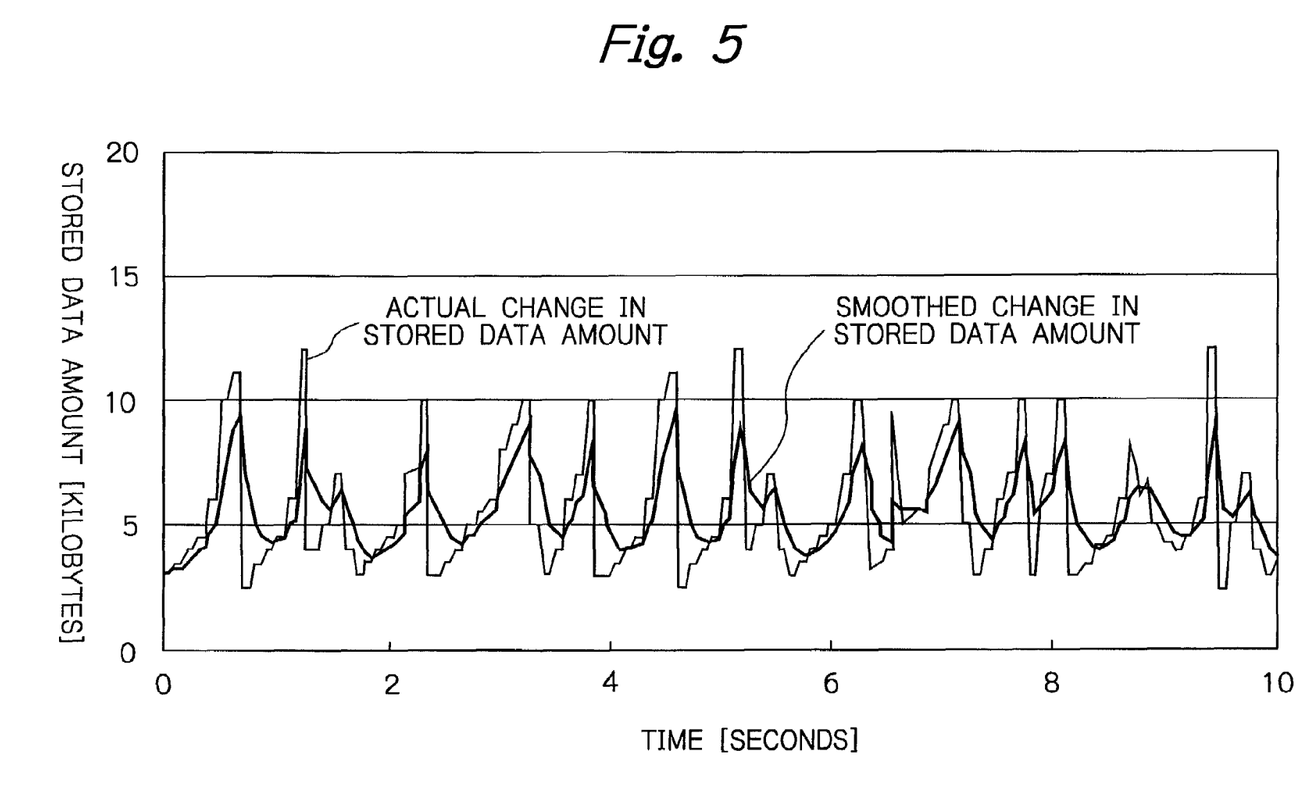
FIG. 5 shows a graph of an actual change in the stored data amount and a smoothed change in the stored data amount with respect to a time.

FIG. 5 illustrates characteristics of an actual change in the stored data amount and a smoothed change in the stored data amount with respect to a time.

In case that a time period T for monitoring the stored data amount is short, the amount of change in the monitored data amount will increase and therefore the detection of the congestion preview state or the congestion avoidance state may frequently occur. In order to prevent frequent detections of the congestion preview state or the congestion avoidance state, it is desired to smooth a value of the stored data amount used in the judgment of the congestion. For example, the amount of data stored now q_now may be smoothed every time packets were stored by the following equation;

$$q\_now=(1-W)\times q\_prev + W\times q\_actual$$

where q_actual indicates an actual amount of data now stored and q_prev indicates an amount of stored data calculated before packets were stored. The smoothed change in the stored data amount shown in FIG. 5 corresponds to the calculated result using this equation and assuming as W=0.5.

Figure 6:
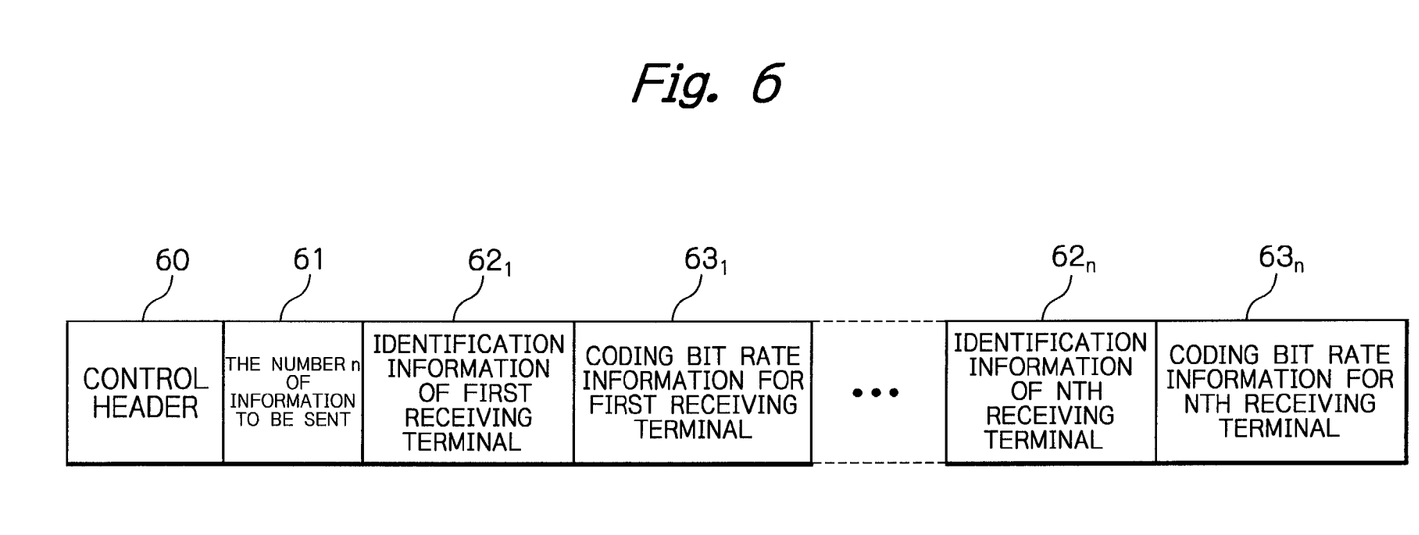
FIG. 6 shows a frame structure of information representing a review of congestion and an avoidance of congestion, formed in a monitored result sending unit.

FIG. 6 illustrates a frame structure of information representing a review of congestion and an avoidance of congestion, formed in the monitored result sending unit 122.

As will be noted from this figure, the frame includes a control header field 60 indicating whether this information represents the congestion preview state or the congestion avoidance state, a field 61 representing the number n of information to be sent, an identification information $62_1$ to $62_g$ of first to n-th receiving terminals and new coding bit rate information $63_1$ to $63_n$ for the respective receiving terminals.

Figure 7:
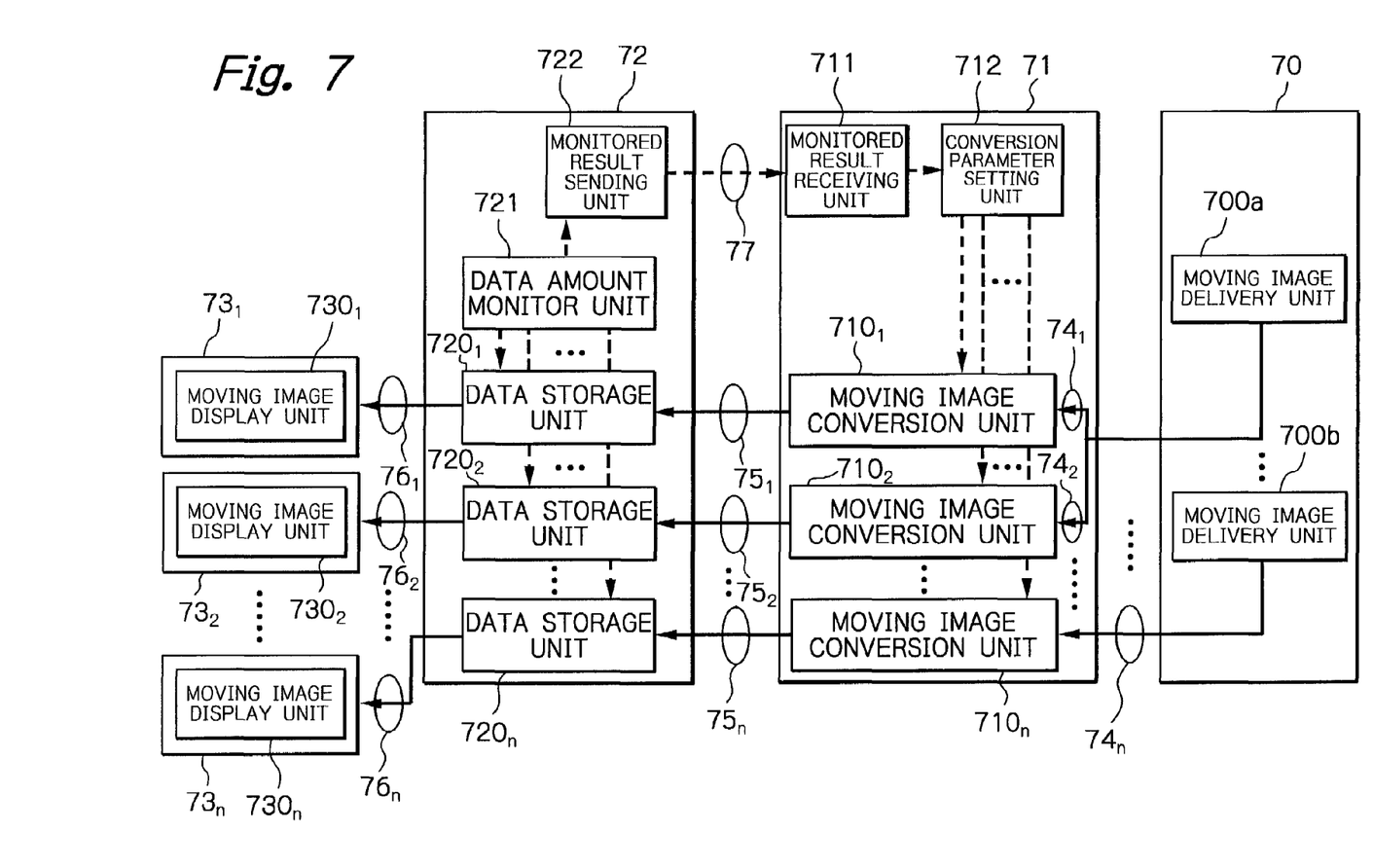
FIG. 7 shows a block diagram illustrating configuration of a communication system adaptable to a plurality of users as another embodiment according to the present invention.

As shown in FIG. 7, a communication system adaptable to a plurality of users illustrated as another embodiment according to the present invention includes a moving image delivery device 70, a moving image conversion device 71, a packet switching device or node 72, and receiving terminals 73 consisting of first to nth receiving terminals $73_1$ to $73_n$ for first to nth users respectively.

The moving image delivery device 70 is provided with moving image delivery units 700a and 700b for the respective contents of moving images. The delivery unit 700a sends moving image data to first and second moving image conversion units $710_1$ and $710_2$ in the moving image conversion device 71 via first communication lines or channels $74_1$ and $74_2$, respectively. The delivery unit 700b sends moving image data to a nth moving image conversion unit $710_n$ in the moving image conversion device 71 via a first communication line or channel $74_n$. The moving image data sent may be preliminarily stored in the moving image delivery device 70 or may not be stored therein.

The moving image conversion device 71 is provided with moving image conversion units $710_1$ to $710_n$, a monitored result receiving unit 711 and a conversion parameter setting unit 712.

The moving image conversion units $710_1$ to $710_n$ obtain conversion parameters from the setting unit 712, convert, depending upon the conversion parameters, the moving image data received via the channels $74_1$ to $74_n$, and then send the converted moving image data to packet switching device 72 the via second communication line or channels $75_1$ to $75_n$, respectively.

The monitored result receiving unit 711 receives a congestion preview information or a congestion avoidance information, containing destination information for specifying a receiving terminal from the packet switching device 72 via a fourth communication line or channel 77, and transfers the received information to the setting unit 712.

The setting unit 712 determines the moving image conversion parameters to decrease an amount of the transferred moving image data by a predetermined amount when a congestion preview information is transferred. If a new coding bit rate calculated in accordance with the monitored result is attached to the congestion preview information received at the receiving unit 711, the setting unit 712 changes the moving image conversion parameters depending upon the attached new coding bit rate.

Also, the setting unit 712 determines the moving image conversion parameters to increase an amount of the transferred moving image data by a predetermined amount when a congestion avoidance information is transferred. If a new coding bit rate calculated in accordance with the monitored result is attached to the congestion avoidance information received at the receiving unit 711, the setting unit 712 changes the moving image conversion parameters depending upon the attached new coding bit rate.

The packet switching node 72 is provided with first to nth data storage units $720_1$ to $720_n$, a data amount monitor unit 721 and a monitored result sending unit 722.

The data storage units $720_1$ to $720_n$ temporarily store the moving image data received via the second channels $75_1$ to $75_n$, and then send the moving image data to third communication lines or channels $76_1$ to $76_n$ which are defined by the destination information for specifying a receiving terminal, contained in the data. The amount of data stored in the storage units $720_1$ to $720_n$ will be gradually increased when the amount of data capable to transfer through the third channels $76_1$ to $76_n$ is smaller than the stored amount of data to be transferred.

The data amount monitor unit 721 monitors a stored amount of data in each of the storage units $720_1$ to $720_n$, and activates the monitor result sending unit 722 when recognizing that the stored data amount reaches a first threshold.

The monitor result sending unit 722 produces a congestion preview information containing a destination information for specifying a receiving terminal when triggered by the monitor unit 721, and sends the produced information to the moving image conversion device 71 via the fourth channel 77. The sending unit 722 may send the congestion preview information with attaching a new coding bit rate calculated in accordance with the monitored result.

The data amount monitor unit 721 also monitors a stored amount of data in each of the storage units $720_1$ to $720_n$, and activates the monitor result sending unit 722 when recognizing that the stored data amount decreases lower than a second threshold after it reaches the first threshold.

In this case, the monitor result sending unit 722 produces a congestion avoidance information containing a destination information for specifying a receiving terminal when triggered by the monitor unit 721, and sends the produced information to the moving image conversion device 71 via the fourth channel 77. The sending unit 722 may send the congestion avoidance information with attaching a new coding bit rate calculated in accordance with the monitored result.

The receiving terminals $73_1$ to $73_n$ are provided with moving image display units $730_1$ to $730_n$ for displaying moving images based upon the data received through the third channels $76_1$ to $76_n$, respectively.

In modification, the aforementioned moving image conversion units and data amount monitor units may be located in the same node.

As will be noted, in this embodiment, the moving image delivery units 700a and 700b are provided for the respective contents of moving images. The moving image delivery unit 700a delivers moving image data to the first and second users upon their requests and the moving image delivery unit 700b delivers moving image data to the nth user upon its request. The moving image conversion units $710_1$ to $710_n$ and the data storage units $720_1$ to $720_n$ are provided for the respective users because traffic conditions and capacity of receiving terminals differ from each other. Since the congestion state is judged for every receiving terminal, data traffic control in a public communication network is enabled.

Other configurations, operations and advantages of this embodiment are the same as those in the embodiment of FIG. 1.

In modification, a plurality of moving image conversion devices and a plurality of packet switching devices may be provided for the respective users.

Many widely different embodiments of the present invention may be constructed without departing from the spirit and scope of the present invention. It should be understood that the present invention is not limited to the specific embodiments described in the specification, except as defined in the appended claims.

What is claimed is:

1. A communication system capable of avoiding congestion in transmission of moving image data, comprising:
   at least one receiving terminal;
   a moving image delivery device for delivering moving image data to said at least one receiving terminal;
   a moving image conversion device including at least one moving image conversion means for converting, in accordance with conversion parameters, the moving image data sent from said moving image delivery device, a conversion parameter setting means for determining the conversion parameters, and a monitored result receiving means; and
   at least one packet switching node including at least one data storage means for preliminarily storing the moving image data from said moving image conversion device to be sent to said at least one receiving terminal, a data amount monitor means for monitoring an amount of the moving image data stored in said at least one data storage means to judge that the monitored data amount reaches a first threshold, and a monitored result sending means for sending a congestion preview information to said moving image conversion device when said data amount monitor means judges that the monitored data amount reaches the first threshold,
   said monitored result receiving means receiving the congestion preview information from said monitored result sending means, said conversion parameter setting means determining the conversion parameters so that said moving image conversion means converts the moving image data sent from said moving image delivery device into a moving image data with a smaller coding bit rate smaller.

2. The communication system as claimed in claim 1, wherein said data amount monitor means monitors an amount of the moving image data stored in said at least one data storage means to judge that the monitored data amount reaches a second threshold which is smaller than said first threshold, wherein said monitored result sending means sends a congestion avoidance information to said moving image conversion device when said data amount monitor means judges that the monitored data amount reaches the second threshold, wherein said monitored result receiving means receives the congestion avoidance information from said monitored result sending means, and wherein said conversion parameter setting means determines the conversion parameters so that said moving image conversion means converts the moving image data sent from said moving image delivery device into a moving image data with a larger coding bit rate.

3. The communication system as claimed in claim 2, wherein said data amount monitor means judges that it is the congestion preview state until the monitored data amount reaches the second threshold after the monitored data amount reaches the first threshold, and that it is the congestion avoidance state until the monitored data amount reaches the first threshold after the monitored data amount reaches the second threshold.

4. The communication system as claimed in claim 2, wherein said monitored result sending means sends the congestion preview information or the congestion avoidance information at a constant interval.

5. The communication system as claimed in claim 1, wherein said data amount monitor means calculates a new coding bit rate when said data amount monitor means judges that the monitored data amount reaches the first threshold, wherein said monitored result sending means sends the calculated new coding bit rate in addition to the congestion preview information, wherein said monitored result receiving means receives the calculated new coding bit rate in addition to the congestion preview information, and wherein said conversion parameter setting means determines the conversion parameters so that said moving image conversion means converts the moving image data sent from said moving image delivery device depending upon the calculated new coding bit rate.

6. The communication system as claimed in claim 5, wherein said data amount monitor means calculates a new coding bit rate enabling to avoid congestion state after a lapse of a predetermined time, depending upon a change in the stored data amount during a predetermined period of time.

7. The communication system as claimed in claim 6, wherein said data amount monitor means calculates a low coding bit rate so as to decrease a difference between an estimate data amount after a lapse of the predetermined time and a second threshold which is smaller than said first threshold, when the change in the stored data amount during a predetermined period of time is positive change.

8. The communication system as claimed in claim 6, wherein said data amount monitor means calculates a high coding bit rate so as to increase a difference between an estimate data amount after a lapse of the predetermined time and an amount of data now stored, when the change in the stored data amount during a predetermined period of time is negative change.

9. The communication system as claimed in claim 1, wherein said data amount monitor means monitors, instead of the amount of data stored in said at least one data storage means, a data amount which is smoothed in accordance with the amount of data stored in said at least one data storage means.

10. The communication system as claimed in claim 1, wherein said at least one receiving terminal includes a plurality of receiving terminals, and said conversion parameter setting means includes a plurality of conversion parameter setting means for the respective receiving terminals, wherein said at least one data storage means includes a plurality of data storage means for preliminarily storing the moving image data to be sent to the respective receiving terminals, said data amount monitor means monitors the stored data for the respective receiving terminals, and said monitored result sending means sends the congestion preview information or the congestion avoidance information for the respective receiving terminals, and wherein said monitored result receiving means receives the congestion preview information or the congestion avoidance information for the respective receiving terminals, and said conversion parameter setting means determines the conversion parameters for the respective receiving terminals.

11. A communication method capable of avoiding congestion in transmission of moving image data, comprising the steps of:
converting moving image data to be delivered to at least one receiving terminal, in accordance with conversion parameters;
preliminarily storing the converted moving image data to be sent to said at least one receiving terminal;
monitoring an amount of the stored moving image data to judge that the monitored data amount reaches a first threshold;
sending a congestion preview information when it is judge that the monitored data amount reaches the first threshold;
receiving the sent congestion preview information; and
determining the conversion parameters so that said converting step converts the moving image data into a moving image data with a smaller coding bit rate.

12. The communication method as claimed in claim 11, wherein said monitoring step includes monitoring an amount of the stored moving image data to judge that the monitored data amount reaches a second threshold which is smaller than said first threshold, wherein said sending step include sending a congestion avoidance information when it is judged that the monitored data amount reaches the second threshold, wherein said receiving step includes receiving the congestion avoidance information, and wherein said determining step includes determining the conversion parameters so that said converting step converts the sent moving image data into a moving image data with a larger coding bit rate.

13. The communication method as claimed in claim 12, wherein said monitoring step includes judging that it is the congestion preview state until the monitored data amount reaches the second threshold after the monitored data amount reaches the first threshold, and judging that it is the congestion avoidance state until the monitored data amount reaches the first threshold after the monitored data amount reaches the second threshold.

14. The communication method as claimed in claim 12, wherein said sending step includes sending the congestion preview information or the congestion avoidance information at a constant interval.

15. The communication method as claimed in claim 11, wherein said monitoring step includes calculating a new coding bit rate when it is judged that the monitored data amount reaches the first threshold, wherein said sending step includes sending the calculated new coding bit rate in addition to the congestion preview information, wherein said receiving step include receiving the calculated new coding bit rate in addition to the congestion preview information, and wherein said determining step includes determining the conversion parameters so that said converting step converts the moving image data depending upon the calculated new coding bit rate.

16. The communication method as claimed in claim 15, wherein said monitoring step includes calculating a new coding bit rate enabling to avoid congestion state after a lapse of a predetermined time, depending upon a change in the stored data amount during a predetermined period of time.

17. The communication method as claimed in claim 16, wherein said monitoring step includes calculating a low coding bit rate so as to decrease a difference between an estimate data amount after a lapse of the predetermined time and a second threshold which is smaller than said first threshold, when the change in the stored data amount during a predetermined period of time is positive change.

18. The communication method as claimed in claim 16, wherein said monitoring step includes calculating a high coding bit rate so as to increase a difference between an estimate data amount after a lapse of the predetermined time and an amount of data now stored, when the change in the stored data amount during a predetermined period of time is negative change.

19. The communication method as claimed in claim 16, wherein said monitoring step includes monitoring, instead of the stored data amount, a data amount which is smoothed in accordance with the stored data amount.

20. The communication method as claimed in claim 11, wherein said converting step includes converting the moving image data to be sent to a plurality of receiving terminals, said storing step includes preliminarily storing the converted moving image data for the respective receiving terminals, said monitoring step includes monitoring the stored data for the respective receiving terminals, and said sending step include sending the congestion preview information or the congestion avoidance information for the respective receiving terminals, and wherein said receiving step includes receiving the congestion preview information or the congestion avoidance information for the respective receiving terminals, and said determining step includes determining a plurality of conversion parameters for the respective receiving terminals.

* * * * *